United States Patent [19]

Stankewitz

[11] Patent Number: 4,881,802
[45] Date of Patent: Nov. 21, 1989

[54] COMBINED BRIGHT FIELD-DARK FIELD INCIDENT LIGHT ILLUMINATION APPARATUS

[75] Inventor: H. W. Stankewitz, Wetzlar, Fed. Rep. of Germany

[73] Assignee: Ernst Leitz Wetzlar GmbH, Wetzlar, Fed. Rep. of Germany

[21] Appl. No.: 189,546

[22] Filed: May 3, 1988

[30] Foreign Application Priority Data

May 5, 1987 [DE] Fed. Rep. of Germany ....... 3714830

[51] Int. Cl.[4] ...................... G02B 21/10; G02B 26/02; G02B 21/12
[52] U.S. Cl. .................................. 350/525; 350/266
[58] Field of Search ............... 350/507, 520, 523, 525, 350/266

[56] References Cited

U.S. PATENT DOCUMENTS 4,127,318 11/1978 Determann et al. ................. 350/525

FOREIGN PATENT DOCUMENTS 2021784 11/1970 Fed. Rep. of Germany .
2925407  2/1980 Fed. Rep. of Germany .
3100662 11/1981 Fed. Rep. of Germany .

Primary Examiner—Bruce Y. Arnold
Assistant Examiner—Ronald M. Kachmarik
Attorney, Agent, or Firm—Foley & Lardner, Schartz, Jeffery, Schwaab, Mack, Blumenthal & Evans

[57] ABSTRACT

A combined bright field-dark field incident light apparatus 10 for a microscope instrument is described, in which in the dark field illumination the plane of the field diaphragm LF is projected into the object plane 25 via at least one intermediate image LF'. This comprises providing in the beam path at least three annular optical elements (19, 28, 29), arranged so that illuminating rays incident from a skew direction are also projected into the object plane 25. The form of the annular optical elements 19, 27 allows them to be assigned different optical properties at the same time.

26 Claims, 2 Drawing Sheets

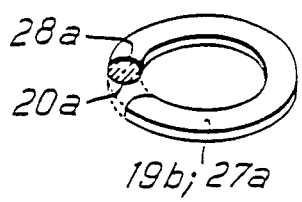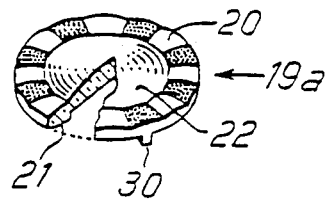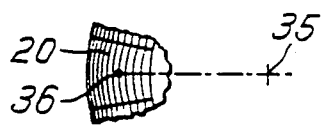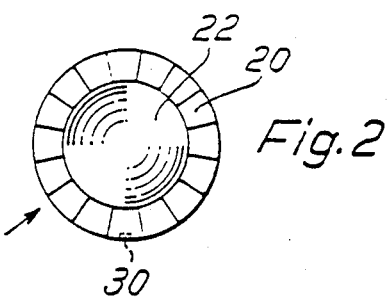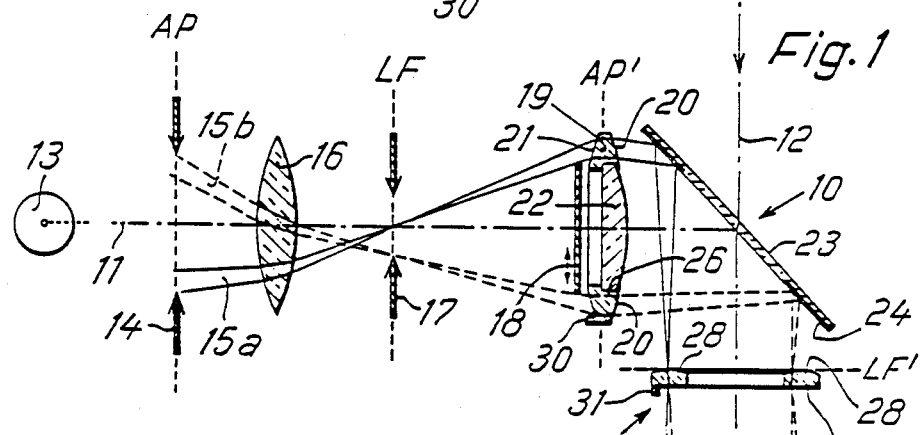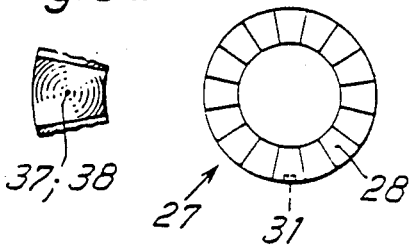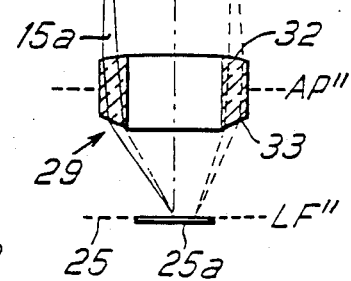

COMBINED BRIGHT FIELD-DARK FIELD INCIDENT LIGHT ILLUMINATION APPARATUS

BACKGROUND OF THE INVENTION

The present invention relates to a combined bright field-dark field incident light illumination apparatus for microscope instruments, including a device that can be brought into the illuminating beam as desired in order to suppress the bright field ray bundle.

In incident light illumination apparatuses which allow change as desired between bright field and dark field incident light illumination, at least part of the dark field ray bundle is kept parallel. However, in this projection to infinity, the external and internal part of the ray bundle is lost for the illumination of the dark field. This leads to a non-uniform object illumination, there being a degradation in contrast due to the inner ray bundle. In order to achieve an extensive compensation of the non-uniform object illumination it was proposed in German Offenlegungsschrift No. 2,021,784 to design the optical elements arranged in the illuminating beam to have a light transmission decreasing toward the center. However, this leads to an undesired reduction in the total brightness, which is particularly disadvantageous for large object fields.

Furthermore, it is known from German Offenlegungsschrift No. 3,100,662 to bring the dark field incident light illuminating beam to the object field via optical fibers. Although in this way it is possible largely to disregard a non-uniform object illumination, here, too, it is necessary to accept a reduction in the total brightness due to the optical fibers.

Moreover, German Offenlegungsschrift No. 2,925,407 contains a description of an incident light illumination apparatus which allows change as desired between bright field and dark field illumination. The change is carried out by a rotationally symmetrical stepped reflector which can be brought into the bright field beam, with the illuminating rays being reflected in a staircase-like manner into the dark field beams. This dark field beam is provided with a combined mirror-lens arrangement, which leads the image of the field diaphragm plane around the observation optics and into the object plane. The use of such a light ladder to change between the bright field and dark field illumination as desired can certainly achieve a higher efficiency for the light source; however, this places extreme demands on the accuracy of positioning of the light ladder, so that the projection of the plane of the field diaphragm is possible only directly into the object. With this known apparatus, larger and bright object fields cannot be illuminated uniformly in the incident light dark field.

SUMMARY OF THE INVENTION

It is therefore an object of the present invention to provide an improved combined bright field-dark field incident light illumination device.

It is a particular object of the invention to avoid the disadvantages of the known arrangements and to design the dark field incident light illuminating beam in such a way that an unproblematical change between the bright field and dark field illumination is guaranteed and large object fields can be uniformly illuminated in the dark field vertical illumination without loss of total brightness.

In accomplishing the foregoing objects, there has been provided in accordance with one aspect of the present invention a combined bright field-dark field incident light illumination apparatus suitable for microscope instruments having an object plane, comprising: means, including a light source, for producing an illuminating beam including a bright field ray bundle and a generally annular dark field ray bundle, the illuminating beam having a uniformly illuminated area at a point along its axis; means for selectively suppressing the bright field ray bundle; and means for projecting the uniformly illuminated area into the object plane via at least one intermediate image. The projecting means comprises at least three annular optical elements positioned in the dark field ray bundle. Preferably, the uniformly illuminated area comprises the plane of a field diaphragm.

In accordance with another aspect of the invention, there has been provided a microscope comprising an incident light illuminating system of the foregoing type.

Further objects, features and advantages of the present invention will become apparent from the detailed description of preferred embodiments that follows, when considered with the attached figures of drawing. It should be understood, however, that the detailed description and the specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The invention is represented schematically in several illustrative embodiments in the drawings, in which:

FIG. 1 is a schematic drawing showing an incident light illumination apparatus in the dark field mode;

FIG. 2 is a plan view showing a first annular optical element in the form of a lens drum, seen along the line of sight from the annular mirror;

FIG. 2a is a perspective representation, partly sectioned, of the annular optical element and a lens as an integrated component;

FIG. 2b is a detailed view showing an individual lens drum area of the optical element represented in FIG. 2;

FIG. 3 is a plan view of a second annular optical element in the form of a lens drum seen along the line of sight from the annular mirror;

FIG. 3a is a plan view of an individual lens drum area of the second annular optical element;

FIG. 4 is a perspective view showing a further variant in the design of the optically effective areas of the annular optical elements.

DETAILED DESCRIPTION OF PREFERRED EMBODIMENTS

Figure 5:
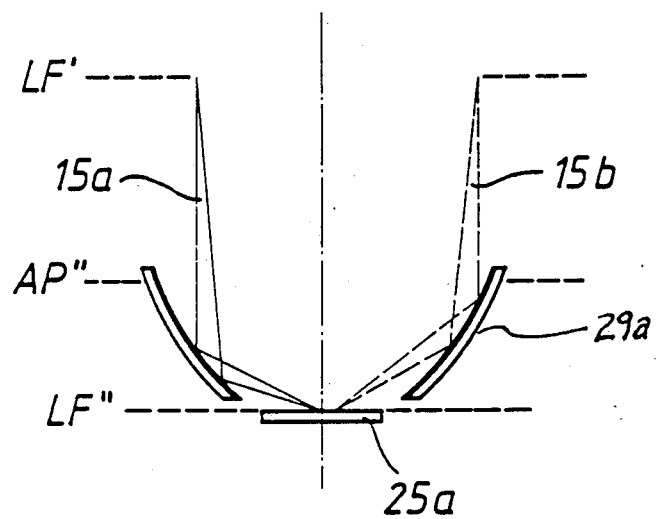
FIG. 5 is a detailed view of a third annular optical element including an annular mirror according to the present invention.

FIG. 1 shows a combined bright field-dark field incident light illumination apparatus 10 for a microscope or like instrument. The apparatus includes an illuminating beam path 11 and an observation beam path 12 arranged perpendicularly with respect thereto. Proceeding from a light source 13, the illuminating beam 11 has an adjustable aperture diaphragm 14 located in the aperture plane AP, two dark field ray bundles 15a, 15b proceeding from the aperture plane AP, a first collector lens 16, an adjustable diaphragm 17 located in the plane of the field diaphragm LF, a pivotable stop device 18 and a first annular optical element 19, in the form of a lens drum (i.e., a ring of lenses), with a convex light entrance surface 21 and convex lens drum areas 20. This first annular optical element 19 has an internal recess 26 to accommodate a second collector lens 22 effective for the illumination of the bright field. To deflect the illuminating beam, a known partially transmitting annular mirror 23 is located at an angle of 45° to the illuminating beam 11, so that illuminating rays from the light source 13 are deflected into the object plane 25, and light rays from the object plane 25 are transmitted along the observation beam path 12. On its outer surface 24 facing the object plane 25, the annular mirror 23 is full-silvered to deflect the dark field illuminating beams 15a, 15b. In the further path of the observation beam 12 there is a second annular optical element 27, in the form of a lens drum, with convex lens drum areas 28 and a planar light exit surface 34. Furthermore, in the beam 12 there is provided a third annular optical element 29, in the form of an annular lens with a toric-convex light entrance surface 32 and a toric-concave light exit surface 33. It is possible, of course, to use an annular mirror 29a in place of the annular lens 29 as shown in FIG. 5.

By means of a lens arrangement (not shown) in the aperture plane AP, the light source 13 produces an intermediate image of itself. The first collector lens 16 is arranged so that the plane of the field diaphragm LF is uniformly illuminated and an intermediate image AP' of the aperture plane AP is produced. The first annular optical element 19 is arranged with the second collector lens 22 in or near this plane AP'. In order to block out the bright field ray bundle in the dark field mode, the pivotable stop device 18 is brought into the illuminating beam 11 in front of this second collector lens 22. Via the annular mirror 23, the first annular optical element 19 focuses the dark field rays 15a, 15b parallel to the axis of the observation beam 12 into an intermediate image LF' of the plane of the field diaphragm LF near the second annular optical element 27. This second annular optical element 27 focuses the intermediate image of the aperture plane AP' into a conjugated plane AP'', in which the annular lens 29 is located. To illuminate the dark field, the annular lens 29 in the object plane 25 produces a second plane LF'' conjugate to the plane of the field diaphragm 17.

Through the path of the dark field ray bundle 15b, whose starting point in the aperture plane or the plane of the field diaphragm lies outside the plane of the paper, FIG. 1 shows that illuminating beams which meet the optical elements (here: 27) from a skew direction are also used to illuminate the dark field in the object plane 25.

FIG. 2 represents the first annular optical element 19, in the form of a lens drum, with the individual lens drum areas 20 seen along the line of sight from the annular mirror 23. The second collector lens 22 is located in the middle of this optical element 19. A nose 30 is provided at the edge of the optical element 19 to simplify its adjustment in the illuminating beam 11.

FIG. 2a shows a perspective representation of the annular optical element 19 with the collector lens 22 located inside the annulus in the form of an integrated component. This arrangement has the particular advantage that there is no expenditure for producing the recess 26 (FIG. 1) or cementing and centering the collector lens 22. The manufacture of such a component 19a can be done with a spray process using a suitable plastic. Here, it is possible in an advantageous way to design the mold for the manufacture of such an element with a lens drum so that the second optically effective area is varied while the lens drum is retained. In this way it is possible to alter the optical properties of such an element with the least possible expense. It is also shown in FIG. 2a that the optical element 19a exhibits the lens drum area 20 on only one side, the light entrance surface 21 of the optical element 19a being curved. Furthermore, the hatching of individual lens drum areas 20 indicates here that the annular optical element 19a has a different optical density or a different spectral transmission. It is possible in this way, for example, to dispense with additional color or neutral filters, or similar, in the illuminating beam.

FIG. 2b shows the form of the surface of an individual lens drum area 20 of the annular optical element 19 seen along the line of sight from the annular mirror. The hatching clearly shows that the geometrical vertex 35 of this spherical surface 20 lies outside the central point of the area 36.

In a way similar to FIG. 2, FIG. 3 shows the second annular optical element 27, in the form of a lens drum, with the individual plane-convex lens drum areas 28 seen along the line of sight from the annular mirror 23. Here, too, a nose 31 is provided at the edge in the same position as for the first annular optical element 19. In addition to the alignment in the observation beam 12, this also simplifies a precise mutual adjustment of the individual lens drum areas 20, 28 of the two annular optical elements 19, 27.

FIG. 3a represents and individual lens drum area 28 of the annular optical element 27 seen along the line of sight from the annular mirror 23. The spherical area 28 is (in comparison with FIG. 2b) designed so that the geometrical vertex 37 coincides with the center point of area 38.

FIG. 4 shows a perspective representation of a further variant in the design of the optically effective areas of the annular elements 19b, 27a. Geometrically, the areas 20a, 28a of the element 19b, 27a represent part of a ring or annulus, i.e., shaped like a tire. Ring lenses 19b, 27a of such design can be produced even more economically, but when used in the beam 11, 12 and in the configuration in the plane AP' 19b or LF' 27a of FIG. 1, they have the disadvantage that illuminating rays incident from a skew direction are at least partially lost for illumination of the dark field.

Using the apparatus according to the invention, it is possible to project a larger illuminating aperture given an object field of comparatively the same size, or to illuminate a larger object field given the same aperture. Further, with the use of optics projecting to infinity, a larger distance between annular mirror and object field is possible, thus creating room for additional microscope equipment. Because of the special design and arrangement of the annular optical elements, dark field illuminating rays issuing in a skew direction from the plane of the field diaphragm are also projected into the object plane.

What is claimed is:

1. A combined bright field-dark field incident light illumination apparatus suitable for microscope instruments having an object plane, comprising:
   means, including a light source, for producing an illuminating beam including a bright field ray bundle and a generally annular dark field ray bundle, said illuminating beam having a uniformly illuminated area at a point along its axis;

means for selectively suppressing the bright field ray bundle; and means for projecting the uniformly illuminated area into the object plane via at least one intermediate image formed in the dark field ray bundle, said projecting means comprising at least three annular optical elements positioned in the dark field ray bundle.

2. An apparatus as claimed in claim wherein said uniformly illuminated area comprises the plane of a field diaphragm.

3. An apparatus as claimed in claim 2, wherein:
(a) a first annular optical element is located in or near a plane conjugate to an aperture plane;
(b) a second annular optical element is located in or near an intermediate image of the field diaphragm; and
(c) a third annular optical element is located in or near a plane conjugate to the aperture plane.

4. An apparatus as claimed in claim 3, wherein the third annular optical element comprises an annular lens having a toric convex area and a toric concave area.

5. An apparatus as claimed in claim 3, wherein the first optical element additionally comprises at least one centrally located lens.

6. An apparatus as claimed in claim 5, wherein the first optical element includes an internal recess for accommodating the lens.

7. An apparatus as claimed in claim 5, wherein the optical element and the lens form a single component.

8. An apparatus as claimed in claim 3, wherein the first, second and third optical elements are arranged in relation to one another in the illuminating beam so that they project into object plane illuminating beams that are skewed with respect to the optical axis of the illuminating beam.

9. An apparatus as claimed in claim 3, wherein said third annular optical element has the form of an annular mirror.

10. An apparatus as claimed in claim 3, wherein said third annular optical element has the form of an annular lens.

11. An apparatus as claimed in claim 1, wherein at least one of the annular optical elements comprises a curved optically effective area.

12. An apparatus as claimed in claim 11, wherein the curved optically effective areas are spherical.

13. An apparatus as claimed in claim 12, wherein each spherically curved area is formed in such a way that its geometric vertex is offset from its center point. plane illuminating beams that are skewed with respect to the optical axis of the illuminating beam.

14. An apparatus as claimed in claim 11, wherein the curved optically effective areas are aspherical.

15. An apparatus as claimed in claim 11, wherein the curved optically effective areas are toric.

16. A microscope comprising an incident light illumination apparatus as defined by claim 1.

17. A combined bright field-dark field incident light illumination apparatus suitable for microscope instruments having an object plane, comprising:

means, including a light source, for producing an illuminating beam including a bright field ray bundle and a generally annular dark field ray bundle, said illuminating beam having a uniformly illuminated area at a point along its axis;

means for selectively suppressing the bright field ray bundle;

means for projecting the uniformly illuminated area into the object plane via at least one intermediate image, said projecting means comprising at least three annular optical elements positioned in the dark field ray bundle; and wherein a number of the annular optical elements equal to at least one comprises a lens drum having individual curved areas arranged side by side.

18. An apparatus as claimed in claim 17, wherein the lens drum comprises a first optically effective area comprising a lens drum and a curved or planar second optically effective area.

19. An apparatus as claimed in claim 17, wherein the number of annular optical elements comprising a lens drum equals two and wherein, the two annular optical elements have the same number of individual curved lens drum area arranged side by side.

20. An apparatus as claimed in claim 17 wherein, the number of annular optical elements comprising a lens drum equals two and a first annular optical element has a number of lens from areas equal to an even multiple of the number of lens drum areas of a second annular optical element.

21. An apparatus as claimed in claim 17, wherein the lens drum of the annular optical elements has a combination of spherical and aspherical and/or toric lens drum areas.

22. An apparatus as claimed in claim 17, wherein individual lenses of the lens drum areas of at least one optical element have different optical densities.

23. An apparatus as claimed in claim 17, wherein individual lenses of the lens drum areas of at least one optical element have different spectral transmission characteristics.

24. An apparatus as claimed in claim 17, wherein the lens drum of the annular optical elements has a combination of spherical and toric lens drum areas.

25. An apparatus as claimed in claim 17, wherein the lens drum of the annular optical elements has a combination of aspherical and toric lens drum areas.

26. A combined bright field-dark field incident light illumination apparatus suitable for microscope instruments having an object plane, comprising:

means, including a light source, for producing an illuminating beam including a bright field ray bundle and a generally annular dark field ray bundle, said illuminating beam having a uniformly illuminated area at a point along its axis;

means for selectively suppressing the bright field ray bundle;

means for projecting the uniformly illuminated area into the object plane via at least one intermediate image, said projecting means comprising at least three annular optical elements positioned in the dark field ray bundle; and wherein at least two annular optical elements have an identification marker in the form of a protrusion.

* * * * *